United States Patent
Kim et al.

(10) Patent No.: US 9,949,252 B2
(45) Date of Patent: Apr. 17, 2018

(54) METHOD FOR ESTABLISHING WIRELESS CHANNEL INCLUDING DOWNLINK-ORIENTED CHANNEL IN WIRELESS LAN SYSTEM, AND APPARATUS THEREFOR

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 33 days.

(21) Appl. No.: 15/102,263

(22) PCT Filed: Dec. 5, 2014

(86) PCT No.: PCT/KR2014/011909
§ 371 (c)(1),
(2) Date: Jun. 6, 2016

(87) PCT Pub. No.: WO2015/084095
PCT Pub. Date: Jun. 11, 2015

(65) Prior Publication Data
US 2016/0323853 A1    Nov. 3, 2016

Related U.S. Application Data

(60) Provisional application No. 61/912,556, filed on Dec. 6, 2013, provisional application No. 61/926,402, filed on Jan. 13, 2014.

(51) Int. Cl.
*H04W 4/00*     (2009.01)
*H04W 72/04*     (2009.01)
(Continued)

(52) U.S. Cl.
CPC ......... *H04W 72/042* (2013.01); *H04W 72/12* (2013.01); *H04W 74/006* (2013.01)

(58) Field of Classification Search
None
See application file for complete search history.

(56) References Cited

U.S. PATENT DOCUMENTS 7,006,464 B1    2/2006    Gopalakrishnan et al.
8,971,273 B2 *   3/2015    Chan .................. H04W 72/082
                                                                                                370/329
(Continued)

FOREIGN PATENT DOCUMENTS

JP     2011015048     1/2011
JP     2011188382     9/2011
(Continued)

OTHER PUBLICATIONS

PCT International Application No. PCT/KR2014/011909, Notification of Transmittal of the International Search Report and the Written Opinion of the International Searching Authority dated Mar. 18, 2015, 17 pages.
(Continued)

*Primary Examiner* — Bob Phunkulh
(74) *Attorney, Agent, or Firm* — Lee Hong Degerman Kang Waimey

(57) ABSTRACT

The present document relates to a wireless communication system and, more particularly, to a method for establishing a wireless channel by an AP in a high-density wireless LAN system and to an apparatus therefor. The AP configured for this purpose can establish a primary channel and one or more secondary channels, establish one or more downlink oriented channels into one or more secondary channels, but without the one or more downlink oriented channels overlapping the primary channel of an adjacent basic service set (BSS), and transmit, to a station connected to the AP, the
(Continued)

frame including establishment information on the established one or more downlink oriented channels.

11 Claims, 18 Drawing Sheets

(51) Int. Cl.
*H04W 72/12* (2009.01)
*H04W 74/00* (2009.01)

(56) References Cited

U.S. PATENT DOCUMENTS

| | | | | |
|---|---|---|---|---|
| 9,319,202 B2* | 4/2016 | Aboul-Magd | ........ | H04L 5/0058 |
| 2003/0220112 A1* | 11/2003 | Bugeja | ................. | H04W 16/06 |
| | | | | 455/446 |
| 2007/0189214 A1 | 8/2007 | Hyon et al. | | |
| 2008/0227403 A1* | 9/2008 | Taki | ..................... | H04W 48/12 |
| | | | | 455/68 |
| 2009/0232053 A1* | 9/2009 | Taki | ..................... | H04L 1/1614 |
| | | | | 370/328 |
| 2011/0096747 A1* | 4/2011 | Seok | ..................... | H04W 72/04 |
| | | | | 370/329 |
| 2011/0222486 A1 | 9/2011 | Hart | | |
| 2012/0008599 A1* | 1/2012 | Marin | ................. | H04W 74/006 |
| | | | | 370/336 |
| 2012/0026997 A1* | 2/2012 | Seok | ....................... | H04L 5/001 |
| | | | | 370/338 |
| 2012/0044879 A1* | 2/2012 | Park | ..................... | H04W 74/08 |
| | | | | 370/329 |
| 2012/0057534 A1 | 3/2012 | Park | | |
| 2012/0076091 A1 | 3/2012 | Seok | | |
| 2012/0213204 A1* | 8/2012 | Noh | ....................... | H04W 72/02 |
| | | | | 370/331 |
| 2012/0327915 A1* | 12/2012 | Kang | ..................... | H04L 5/0007 |
| | | | | 370/336 |
| 2013/0051256 A1* | 2/2013 | Ong | ..................... | H04W 72/042 |
| | | | | 370/252 |
| 2013/0107833 A1* | 5/2013 | Liu | ..................... | H04W 72/082 |
| | | | | 370/329 |
| 2013/0294289 A1* | 11/2013 | Kneckt | ............... | H04W 72/082 |
| | | | | 370/254 |
| 2014/0153415 A1* | 6/2014 | Choudhury | ........ | H04W 72/0446 |
| | | | | 370/252 |
| 2015/0200883 A1* | 7/2015 | Brotherston | ............ | H04L 51/08 |
| | | | | 709/206 |
| 2015/0208413 A1* | 7/2015 | Takano | ................. | H04W 16/32 |
| | | | | 455/454 |
| 2015/0256323 A1* | 9/2015 | Gandarillas Diego | ... | H04L 5/16 |
| | | | | 370/281 |
| 2015/0295629 A1* | 10/2015 | Xia | ..................... | H04B 7/0491 |
| | | | | 370/329 |

FOREIGN PATENT DOCUMENTS

| | | |
|---|---|---|
| JP | 2013058836 | 3/2013 |
| WO | 2011/129618 | 10/2011 |

OTHER PUBLICATIONS

Rison, M. et al., "LB187 (D2.0) resolution for HT IE subfield applicability to VHT," IEEE P802.11 Wireless LANs, doc>: IEEE 802.11-12/697r1, May 2012, 7 pages.

* cited by examiner

| Element ID | Length | DL oriented channel Operation |
|---|---|---|

Octects :   1   1   2

| Channel center frequency | channel width |
|---|---|

Octects :   1   1

| Element ID | Length | HEW Capabilities Info |
|---|---|---|

Octects :   1   1   1

| DL oriented channel support | Reserved |
|---|---|

Octects :   1   7

CH 1 — Secondary channel 1
CH 2 — Primary channel
CH 3 — DL oriented channel For BSS center
CH 4 — DL oriented channel For BSS edge Channel structure of AP1

CH 1 — Secondary channel 1
CH 2 — Primary channel
CH 3 — DL oriented channel For BSS edge
CH 4 — DL oriented channel For BSS center Channel structure of AP2

METHOD FOR ESTABLISHING WIRELESS CHANNEL INCLUDING DOWNLINK-ORIENTED CHANNEL IN WIRELESS LAN SYSTEM, AND APPARATUS THEREFOR

CROSS-REFERENCE TOP RELATED APPLICATIONS

This application is the National Stage filing under 35 U.S.C. 371 of International Application No. PCT/KR2014/011909, filed on Dec. 5, 2014, which claims the benefit of U.S. Provisional Application Nos. 61/912,556, filed on Dec. 6, 2013, and 61/926,402, filed on Jan. 13, 2014, the contents of which are all hereby incorporated by reference herein in their entirety.

TECHNICAL FIELD

The present invention relates to a wireless communication system, and more particularly, to a method and apparatus for establishing wireless channels including a downlink oriented channel in a high-density Wireless Local Area Network (WLAN) system.

BACKGROUND ART

While downlink channels as proposed hereinbelow may be used in various kinds of wireless communications, a WLAN system will be taken as an exemplary system to which the present invention is applicable.

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

In IEEE 802.11, communication is conducted on a shared wireless medium. Therefore, the communication environment of IEEE 802.11 is fundamentally different from a wired channel environment. For example, communication can be conducted based on Carrier Sense Multiple Access/Collision Detection (CSMA/CD) in the wired channel environment. In other words, once a transmitter transmits a signal, the signal arrives at a receiver without much signal attenuation because there is no great change in the channel environment. If two or more signals collide with each other, they can be detected because power sensed at the receiver instantaneously gets larger than power transmitted by the transmitter.

However, since a channel is affected by various factors (e.g., signal attenuation may increase with a distance or the signal may suffer from instantaneous deep fading) in the wireless channel environment, the transmitter cannot determine by carrier sensing whether the receiver has received a signal successfully or signal collision has occurred.

DISCLOSURE

Technical Problem

In the above-described wireless communication system, there is a need for transmitting and receiving a signal by efficiently controlling interference between Stations (STAs). However, since data transmission from an Access Point (AP) may be delayed due to indirect control between STAs in a high density Wireless Local Area Network (WLAN) system, a technique for efficiently performing data transmission from an AP to a STA is required.

Technical Solution

In an aspect of the present invention, a method of establishing a wireless channel by an Access Point (AP) in a Wireless Local Area Network (WLAN) system includes establishing a primary channel and one or more secondary channels, and configuring the one or more secondary channels as one or more downlink oriented channels. The one or more downlink oriented channels are configured not to overlap with a primary channel of an adjacent Basic Service Set (BSS), and a frame including configuration information about the one or more downlink oriented channels is transmitted to a Station (STA) associated with the AP.

In another aspect of the present invention, an AP for establishing a wireless channel in a WLAN system includes a transceiver configured to transmit and receive signals to and from an STA associated with the AP, and a controller connected to the transceiver and configured to establish a primary channel and one or more secondary channels, and configure the one or more secondary channels as one or more downlink oriented channels. The controller configures the one or more downlink oriented channels not to overlap with a primary channel of an adjacent BSS, and transmit a frame including configuration information about the one or more downlink oriented channels to an STA associated with the AP through the transceiver.

The method may further include transmitting a request message requesting information about the adjacent BSS to the STA associated with the AP, and receiving a response message including information about the adjacent BSS from the STA associated with the AP. The request message requesting information about the adjacent BSS may be broadcast or multicast to a plurality of STAs associated with the AP, and information about the adjacent BSS that one or more of the plurality of STAs have may be received in response messages.

The response message including the information about the adjacent BSS may include at least one of a BSS Identifier (BSSID), primary and secondary channel information, bandwidth information, downlink oriented channel information, and operating class of the adjacent BSS.

If a first STA among STAs associated with the AP is located at a position not overlapped with an area of another BSS, the AP may transmit data to the first STA on a downlink oriented channel. If a second STA among the STAs associated with the AP is located at a position overlapped with an area of another BSS, the AP may transmit data to the second STA on a normal channel other than a downlink oriented channel.

If a first STA among STAs associated with the AP is located at a position not overlapped with an area of another BSS, the AP may transmit data to the first STA on a downlink oriented channel, without exchanging a Request To Send (RTS) frame and a Clear To Send (CTS) frame. If a second STA among the STAs associated with the AP is located at a position overlapped with an area of another BSS, the AP may transmit data to the second STA on a normal channel other than a downlink oriented channel, after exchanging an RTS frame and a CTS frame.

If a data transmission state of a first STA among STAs associated with the AP is equal to or lower than a predetermined level, the AP may transmit data to the first STA on a normal channel other than a downlink oriented channel, or on a downlink oriented channel after exchanging an RTS frame and a CTS frame.

If the number of the one or more downlink oriented channels is 2 or larger, a first-type downlink oriented channel may be configured as a downlink oriented channel for an STA at a position not overlapped with an area of another BSS, and a second-type downlink oriented channel may be configured as a downlink oriented channel for an STA at a position overlapped with an area of another BSS.

The second-type downlink oriented channel may be configured to be a different frequency channel from a second-type downlink oriented channel of an adjacent BSS.

The AP may determine whether each STA associated with the AP is located at a position overlapped with an area of another BSS by receiving a scanning result from the STA.

Advantageous Effects

According to the present invention as described above, system performance can be increased and the data transmission delay of an STA can be minimized, by reducing the data transmission delay of an AP in a high-density WLAN situation in which a plurality of STAs are associated with a single AP.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described above, a detailed description will be given of the introduction of the concept of a downlink oriented channel, and a method and apparatus for conducting communication using a downlink oriented channel in a high-density Wireless Local Area Network (WLAN) system.

Figure 1:
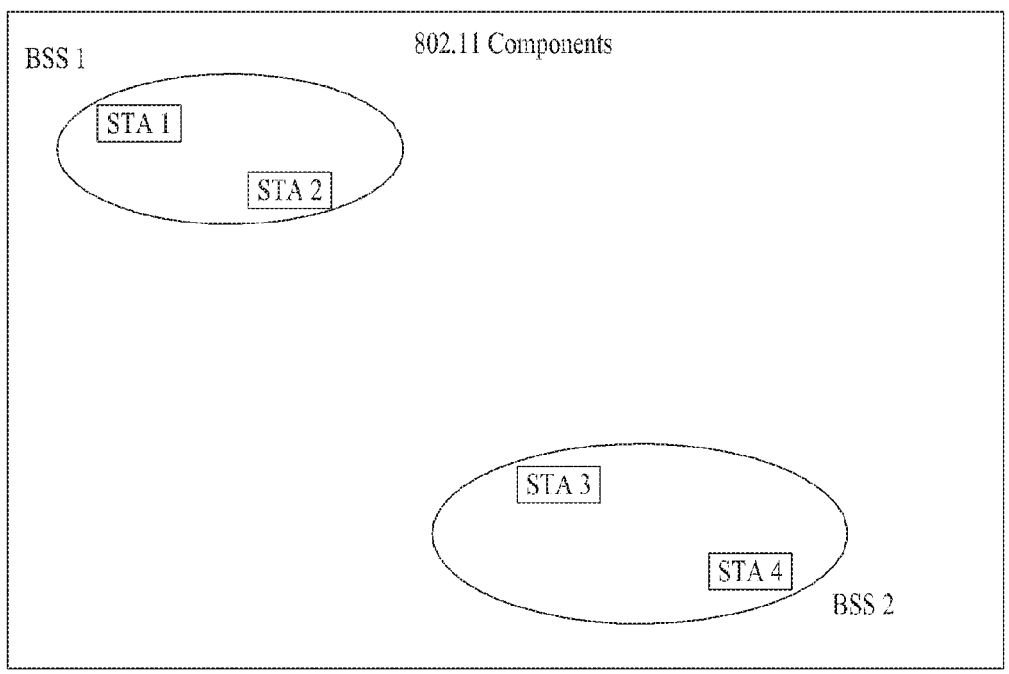
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Medium Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
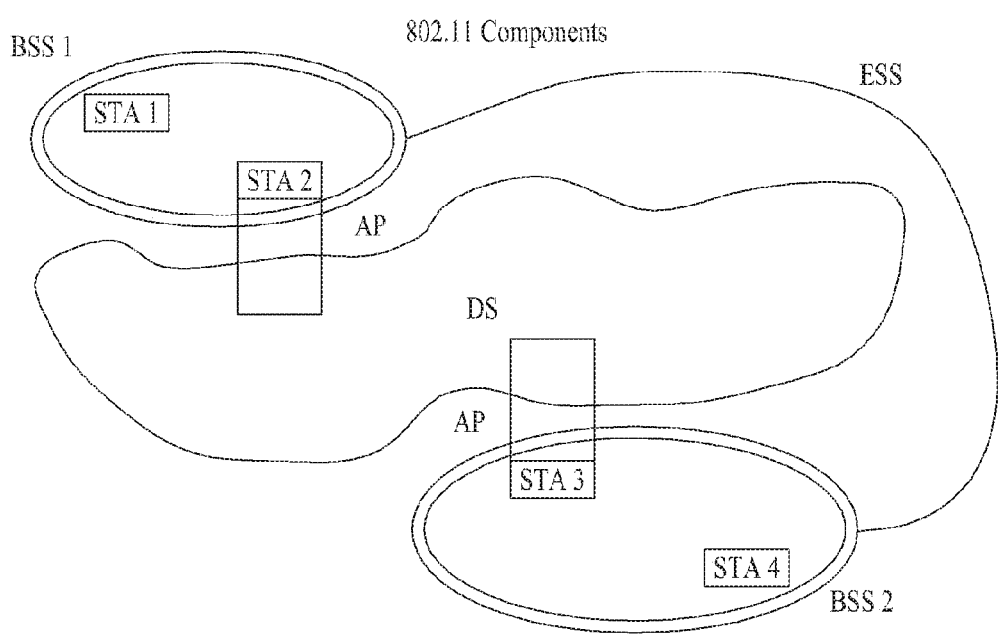
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Now, a collision detection scheme in a WLAN system will be described based on the above description.

Because various factors affect a channel in a wireless environment as described before, a transmitter is not capable of detecting a collision accurately. Accordingly, IEEE 802.11 has introduced a Distributed Coordination Function (DCF) being a Carrier Sense Multiple Access/Collision Avoidance (CSMA/CA) mechanism.

Figure 3:
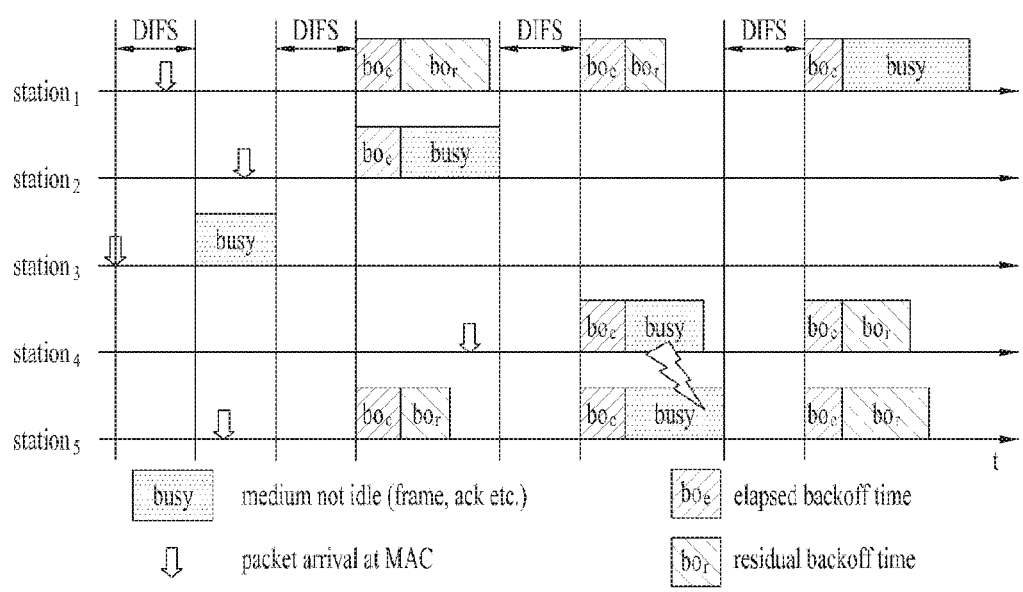
FIG. 3 is a diagram illustrating a Distributed Coordinated Function (DCF) mechanism in a WLAN system.

FIG. 3 illustrates a DCF mechanism in a WLAN system.

According to the DCF mechanism, STAs having transmission data perform Clear Channel Assessment (CCA) by sensing a medium during a specific duration (e.g., DCF Inter-Frame Space (DIFS)) before they transmit the data. If the medium is idle, an STA may transmit its data on the medium. On the contrary, if the medium is busy, the STA may transmit its data after further waiting a random backoff period, on the assumption that a plurality of STAs are waiting to use the medium. The random backoff period enables collision avoidance because each STA has a different backoff interval in probability and thus a different transmission time on the assumption that a plurality of STAs are to transmit data. Once one STA starts transmission, the other STAs may not use the medium.

A random backoff time and a random backoff procedure will be described in brief.

If a specific medium transitions from a busy state to an idle state, a plurality of STAs start to prepare for data transmission. To minimize collision, each STA selects a random backoff count and waits for as long a slot time period as the selected backoff count. The random backoff count is a pseudo-random integer and selected from a range of uniformly distributed values, 0 to CW. CW represents 'contention window'.

Although the CW parameter is initially set to CWmin, it is doubled upon transmission failure. For example, in the case where an ACK for a transmitted frame is not received, it may be determined that collision has occurred. If the CW value reaches CWmax, the STA maintains CWmax until the data transmission is successful. If the data transmission is successful, the CW value is reset to CWmin. Preferably, CW, CWmin, and CWmax are maintained to be $2^n-1$, for the convenience of configuration and operation.

When the random backoff procedure starts, the STA selects a random backoff count from the range of the values 0 to CW and continuously monitors the medium while counting down backoff slots according to the random backoff count. If the medium gets busy, the STA discontinues the count-down. When the medium becomes idle, the STA resumes the count-down of the remaining backoff slots.

Referring to FIG. 3, in the case where a plurality of STAs have data to be transmitted, STA3 may immediately transmit a data frame because the medium is idle during a DIFS, whereas the other STAs wait until the medium is idle. Since the medium has been busy for some time, a plurality of STAs may wait for an opportunity to use the medium. Therefore, each STA selects a random backoff count. Herein, STA2 selects a smallest backoff count and thus transmits a data frame in FIG. 3.

After STA2 completes the transmission, the medium gets idle. Then the STAs resume the count-down of the remaining backoff intervals. In FIG. 3, STA5, which has a second-smallest random backoff count and discontinued its count-down while the medium is busy, counts down the residual backoff slots and starts to transmit a data frame. However, the residual backoff time of STA5 happens to be equal to that of STA4. As a result, collision occurs between STA4 and STA5. Since, either STA4 or STA5 does not receive an ACK after the data transmission, STA4 and STA5 double CW values and select random backoff counts again.

As described before, the basics of CSMA/CA is carrier sensing. An STA uses physical carrier sensing and virtual carrier sensing to determine whether a DCF medium is busy or idle. A Physical layer (PHY) performs physical carrier sensing by energy detection or preamble detection. For example, if the PHY determines that a receiver has measured a voltage level or has read a preamble, it may determine that the medium is busy. In virtual carrier sensing, data transmission of other STAs is prevented by setting a Network Allocation Vector (NAV). This is done by means of a value of a Duration field in a MAC header. Meanwhile, a robust collision detection mechanism has been introduced to reduce the probability of collision. The reason for introducing the robust collision detection mechanism will be described with reference to the following two examples. For the convenience of description, it is assumed that a carrier sensing range is identical to a transmission range.

Figure 4:
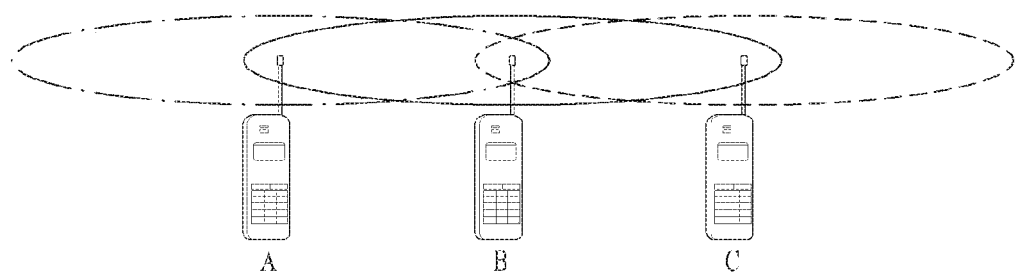
FIGS. 4 and 5 are exemplary diagrams describing problems encountered with a conventional collision resolution mechanism.
Figure 5:
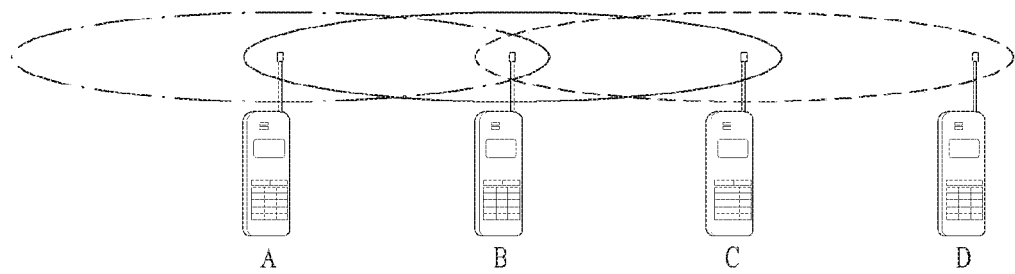

FIGS. 4 and 5 are exemplary diagrams describing problems encountered with a conventional collision resolution mechanism.

Specifically, FIG. 4 is a diagram describing a hidden node issue. In FIG. 4, STA A is communicating with STA B, and STA C has information to be transmitted. Specifically, STA C is likely to determine that a medium is idle during carrier sensing before transmitting data to STA B, although STA A is transmitting information to STA B. Collision occurs because STA B receives information from STA A and STA C simultaneously. Herein, it may be said that STA A is a hidden node to STA C.

FIG. 5 is a diagram describing an exposed node issue. In FIG. 5, STA B is transmitting data to STA A. STA C performs carrier sensing and determines that a medium is busy due to transmission of STA B. Therefore, although STA C has information to be transmitted to STA D, STA C should wait unnecessarily until the medium is idle since the medium is sensed as busy. That is, even though STA A is actually located out of the transmission range of STA C, STA C does not transmit information. Herein, STA C is an exposed node to STA B.

To efficiently utilize a collision avoidance mechanism in the above situation, short signaling packets such as Request To Send (RTS) and Clear To Send (CTS) frames may be introduced, so that neighboring STAs may determine by overhearing whether information is transmitted between two STAs. That is, if a transmitting STA transmits an RTS frame to a receiving STA, the receiving STA may indicate to its neighboring STAs that it will receive data by transmitting a CTS frame to the neighboring STAs.

Figure 6:
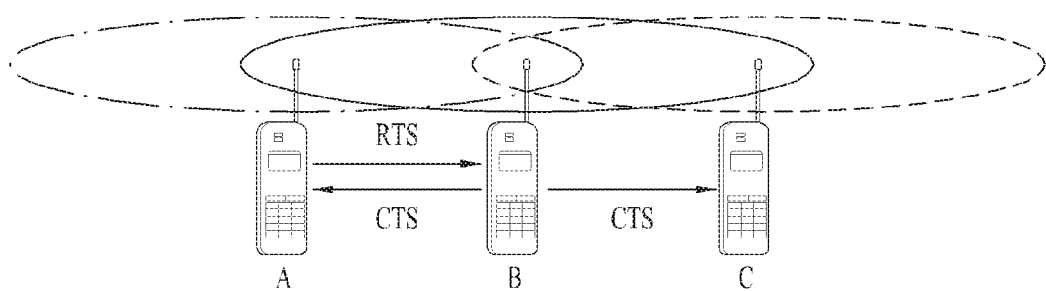
FIG. 6 is a diagram illustrating a mechanism of solving a hidden node issue using a Ready To Send (RTS)/Clear To Send (CTS) frame.

FIG. 6 illustrates a mechanism of solving the hidden node issue.

In FIG. 6, both STA A and STA C are to transmit data to STA B. If STA A transmits an RTS frame to STA B, STA B transmits a CTS frame to its neighboring STAs, both STA A and STA C. As a consequence, STA C waits until STA A and STA B complete data transmission, thus avoiding collision.

Figure 7:
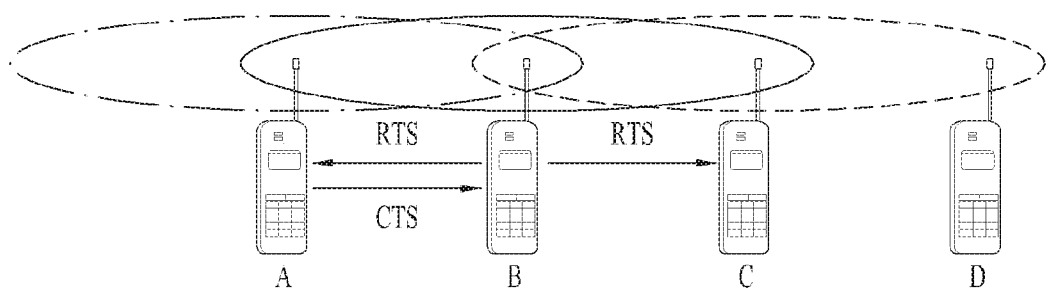
FIG. 7 is a diagram illustrating a mechanism of solving an exposed node issue using an RTS/CTS frame.

FIG. 7 illustrates a mechanism of solving the exposed node issue using an RTS/CTS frame.

It is noted from FIG. 7 that since STA C overhears RTSC/CTS transmission between STA A and STA B, transmission of STA C to STA D does not cause collision. That is, STA B transmits an RTS frame to all neighboring STAs, and only STA A having actual transmission data transmits a CTS frame. Since STA C receives only the RTS frame without receiving the CTS frame, STA C may be aware that STA A is outside the CS range of STA C.

Figure 8:
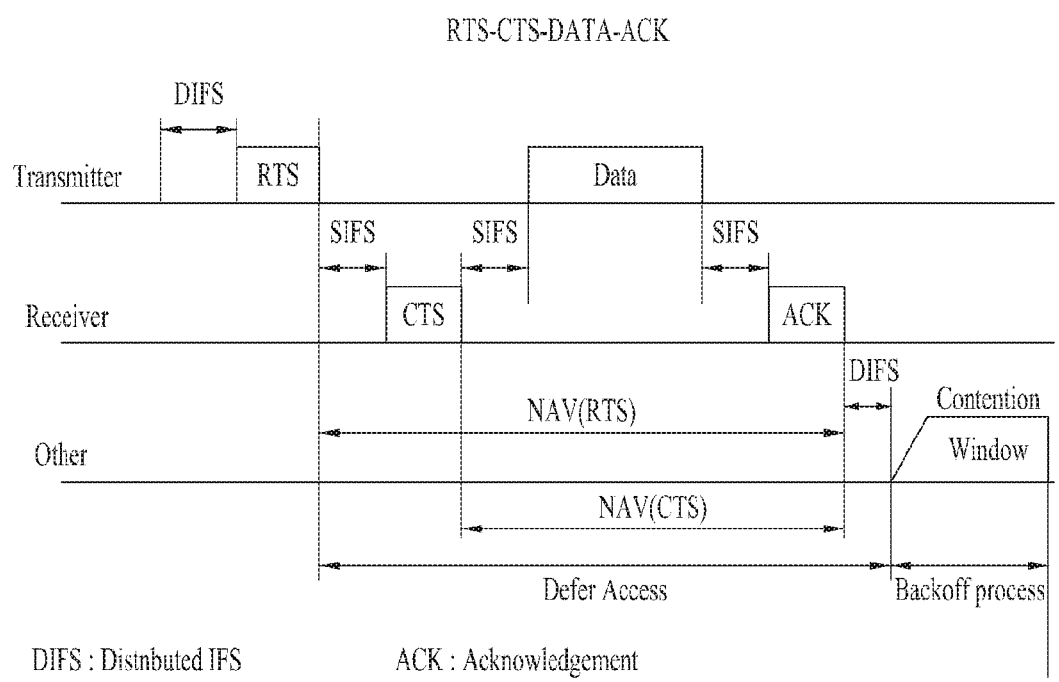
FIG. 8 is a diagram illustrating a specific operation method using an RTS/CTS frame.

FIG. 8 is a diagram illustrating a method for operating using the above-described RTS/CTS frame.

In FIG. 8, a transmitting STA may transmit an RTS frame to a receiving STA after a DIFS. Upon receipt of the RTS frame, the receiving STA may transmit a CTS frame to the transmitting STA after a Short IFS (SIFS). Upon receipt of the CTS frame from the receiving STA, the transmitting STA may transmit data after an SIFS, as illustrated in FIG. 8. Upon receipt of the data, the receiving STA may transmit an ACKnowledgement (ACK) in response to the received data.

Meanwhile, an STA, which has received the RTS/CTS frame of the transmitting STA among neighbor STAs, may determine whether a medium is busy according to reception or non-reception of the RTS/CTS frame, as described before with reference to FIGS. 6 and 7, and may set a Network Allocation Vector (NAV) accordingly. Upon expiration of a time period indicated by the NAC, the collision resolution operation described with reference to FIG. 3 may be performed after a DIFS.

In the legacy WLAN system, a frame is transmitted in a contention-based manner according to a predetermined criterion (e.g., DCF, Enhanced Distributed Channel Access (EDCA), and the like) irrespective of an AP or a non-AP STA. For example, in a state where 100 non-AP STAs are associated with a single AP, every STA transmits a frame equally by contention irrespective of an AP or a non-AP STA. In an actual WLAN environment, the amount of data that an AP transmits to all STAs is larger than or approximate to the amount of data that every STA transmits to the AP. Accordingly, if the AP has data to be transmitted to a number of STAs and many STAs have transmission data, contention may be heated or many collisions may occur. As a consequence, as the AP transmits data to the last STA with a time delay, a user's Quality of Service (QoS) may not be satisfied, or a packet transmission timeout may occur, thus causing discarding of a packet. This situation may be fatal to real-time service such as audio/video streaming.

Moreover, a large amount of data transmitted by the AP may delay transmissions of STAs and thus increase the number of STAs attempting frame transmission. In this case, UL transmissions are suddenly concentrated after a DL transmission, resulting in lots of collisions from hidden nodes as described before.

In this high-density WLAN environment, the present invention proposes that an AP operates a DL oriented channel to reduce DL-UL collision.

Figure 9:
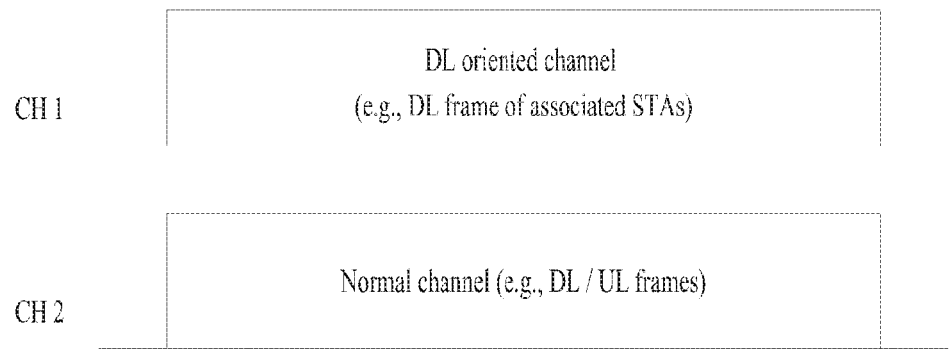
FIG. 9 is a diagram describing the concept of a downlink oriented channel in a WLAN system according to an embodiment of the present invention.

FIG. 9 is a diagram describing the concept of a DL oriented channel in a WLAN system according to an embodiment of the present invention.

As illustrated in FIG. 9, the embodiment of the present invention proposes that when one or more channels are available to an AP, the AP configures one or more channels as DL oriented channels for transmitting data to STAs associated with the AP. In FIG. 9, CH 1 represents a DL oriented channel according to the embodiment, and CH 2 represents a normal channel.

The AP should have normal channels for association of STAs or for supporting legacy STAs. That is, it is assumed that an STA is associated with the AP and transmits and receives data on CH 2 in the same manner as in the legacy WLAN system.

Meanwhile, it is proposed that the AP transmits data to STAs associated with the AP on the DL oriented channel, CH 1 introduced according to the embodiment, without the afore-described contention with UL data transmissions, and receives UL data on the normal channel CH 2. The DL oriented channel is different from the normal channel in that UL data transmission is not performed on the DL oriented channel. However, a control signal (e.g., ACK/Negative ACK (ACK/NACK) of an STA related to data transmission of the AP may be transmitted on the DL oriented channel.

A description will be given below of an operation of an active-mode STA using the above-described DL oriented channel.

Figure 10:
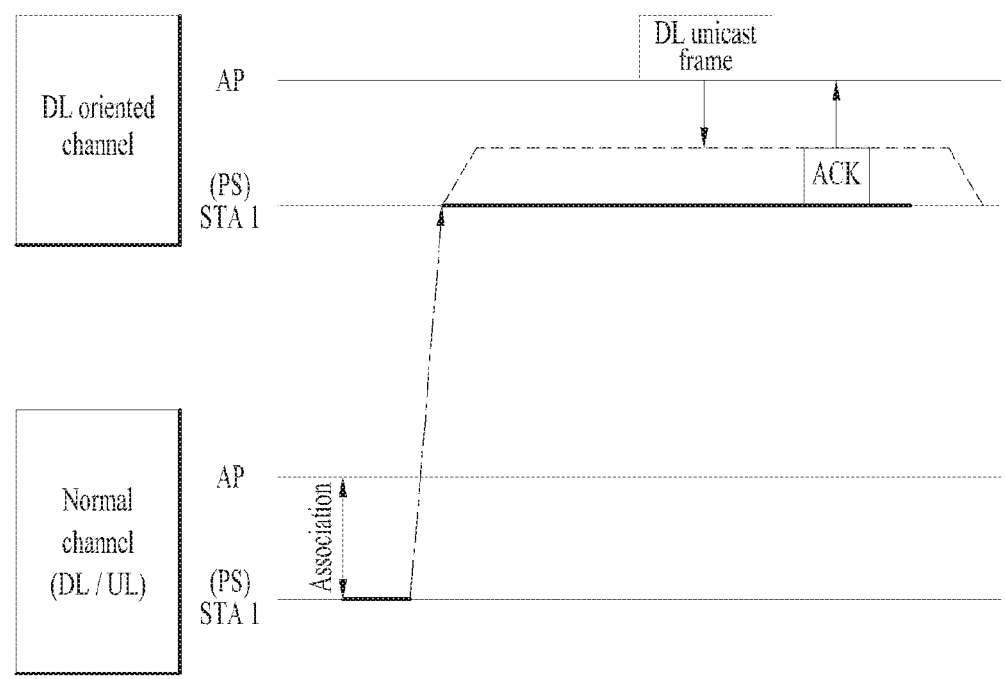
FIG. 10 is a diagram illustrating a method of operating using a downlink oriented channel by an active-mode Station (STA) according to an embodiment of the present invention.

FIG. 10 is a diagram illustrating a method of operating using a DL oriented channel by an active-mode STA according to an embodiment of the present invention.

According to the embodiment, STA 1 may be associated with an AP conventionally. STA 1 may use a normal channel during the association. Meanwhile, if STA 1 associated with the AP operates in active mode, the AP may generally perform the afore-described CCA by switching to a DL oriented channel according to the embodiment. If it turns out from the CCA result that the AP is allowed to transmit data to STA 1, the AP transmits data to STA 1 on the DL oriented channel. Thus, STA 1 may transmit an ACK on the DL oriented channel to the AP.

A procedure for establishing a wireless channel when an AP is to use a DL oriented channel will be described below based on the above description.

If the AP discovers a sufficiently idle channel, the AP may determine a primary channel and a secondary channel on the idle channel. The primary channel may refer to a channel on which all STAs being members of a BSS may operate commonly, and the secondary channel may refer to a 20-MHz channel that High Throughput (HT) STAs may link to the primary channel, for configuring a 40-MHz channel.

Figure 11:
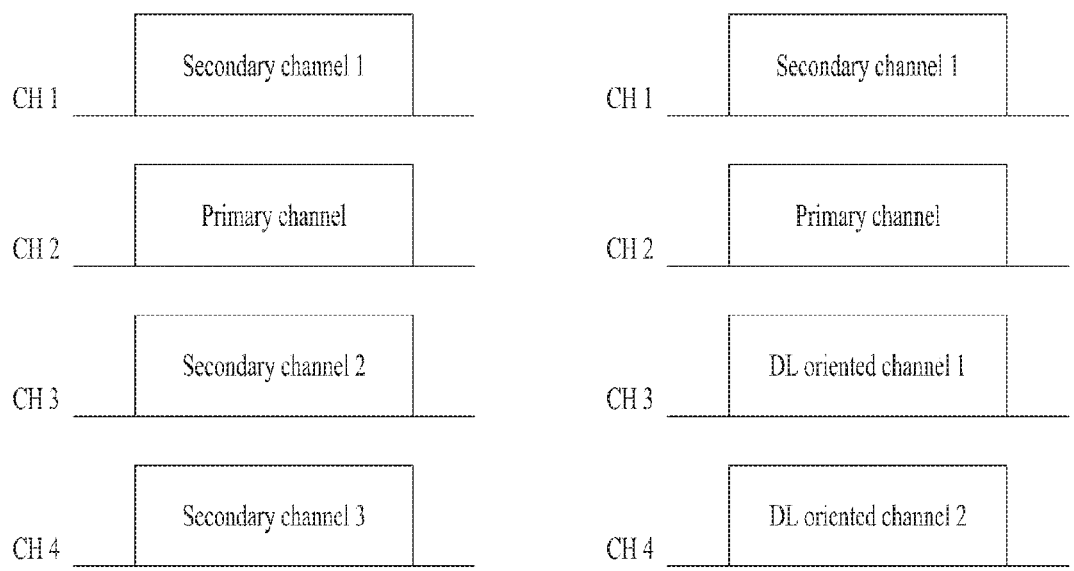
FIG. 11 is a diagram illustrating a method of allocating a wireless channel by an Access Point (AP) according to an embodiment of the present invention.

FIG. 11 is a diagram illustrating a method of allocating a wireless channel by an AP according to an embodiment of the present invention.

In the embodiment, it is proposed that the AP configures one or more of secondary channels as DL oriented channels. For example, it is proposed that if a 20-MHz primary channel, CH 2 and 20-MHz secondary channels, CH 1, CH 3, and CH 4 are configured as in BSS 1, one or more channels CH 3 and CH 4 of the secondary channels are configured as DL oriented channels, as in BSS 2.

The primary channel is shared with the afore-described legacy STAs. It is preferred to configure a DL oriented channel configured for fast data transmission from an AP not in the primary channel but in a secondary channel, thereby minimizing contention.

Figure 12:
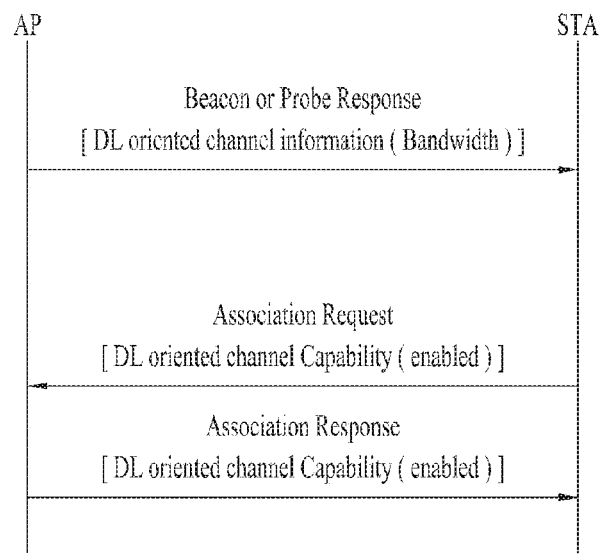
FIG. 12 is a diagram illustrating a method of providing downlink oriented channel configuration information to an STA by an AP according to an embodiment of the present invention.

FIG. 12 is a diagram illustrating a method of providing DL oriented channel configuration information to an STA by an AP according to an embodiment of the present invention.

According to the embodiment, the AP may transmit information about a DL oriented channel to an STA in a Beacon frame or a Probe Response frame. On the other hand, the AP may transmit the DL oriented channel information to the STA in an Association Response frame for an Association Request message that the STA has transmitted in response to the Beacon frame or the Probe Response frame received from the AP.

Figures 13, 14, 15:
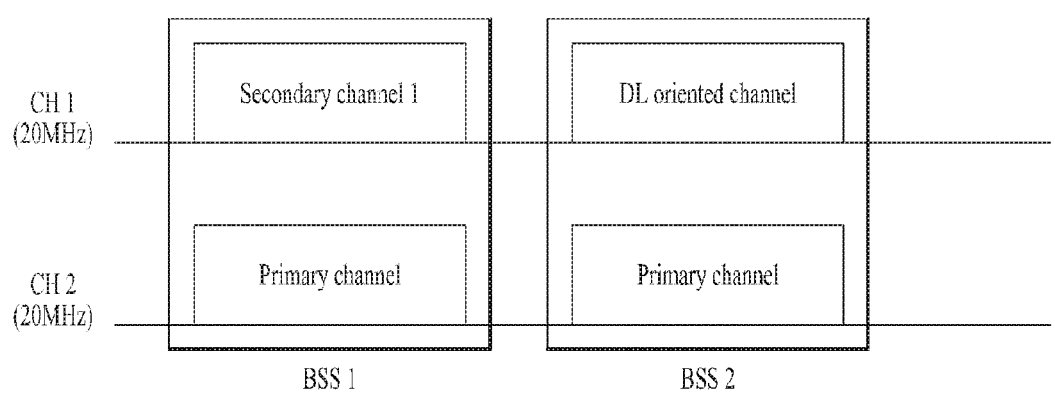
FIGS. 13 and 14 are diagrams illustrating exemplary downlink oriented channel operation information and an exemplary format of a downlink oriented channel operation field, respectively according to an embodiment of the present invention.
FIG. 15 is a diagram illustrating a method of allocating a wireless channel according to a preferred embodiment of the present invention.

The DL oriented channel information may take the form of DL oriented channel operation information as illustrated in FIG. 13. Also, FIG. 14 illustrates an exemplary format of a DL oriented channel Operation field.

As illustrated in FIG. 14, the DL oriented channel Operation field may include a Channel Center Frequency subfield and a Channel Width subfield, which may be defined as illustrated in [Table 1].

TABLE 1

| Subfield | Density | Encoding |
| --- | --- | --- |
| Channel Center Frequency | Defines the channel center frequency for DL oriented channel | For DL oriented channel width, indicates the channel center frequency index for the DL oriented channel |
| Channel width | Defines the channel widths that may be used to transmit to the STA. | Set to 0 for a 20 MHz channel width<br>Set to 1 for a 40 MHz channel width<br>Set to 2 for a 80 Mhz channel width<br>3~255 |

FIG. 15 is a diagram illustrating a method of allocating a wireless channel according to a preferred embodiment of the present invention.

According to the embodiment, if channels are busy, an AP may configure appropriate ones out of the busy channels as a primary channel and secondary channels and configure a DL oriented channel in a secondary channel. Also, it is preferred not to allocate the primary channel as a secondary channel of another BSS in order to reduce a channel busy situation and thus efficiently use a total band in the case of a contention-based operation. Therefore, the primary channel of BSS 1 is configured to be overlapped with the primary channel of BSS 2 as illustrated in FIG. 15. Further, the AP configures a DL oriented channel not to overlap with the primary channel of another BSS.

To implement the above-described configuration, a non-AP STA may determine whether a current discovered AP supports a DL oriented channel by scanning (e.g., a Beacon frame or a Probe Response frame), and as illustrated in FIG. 12, may transmit to the AP DL oriented channel capability information indicating whether a DL oriented channel is supported during association, according to the embodiment.

The DL oriented channel capability information may be included in an Association Request/Association Response message. The DL oriented channel capability information may take the form of a HEW Capabilities element illustrated in FIG. 16.

Figures 16, 17, 18:
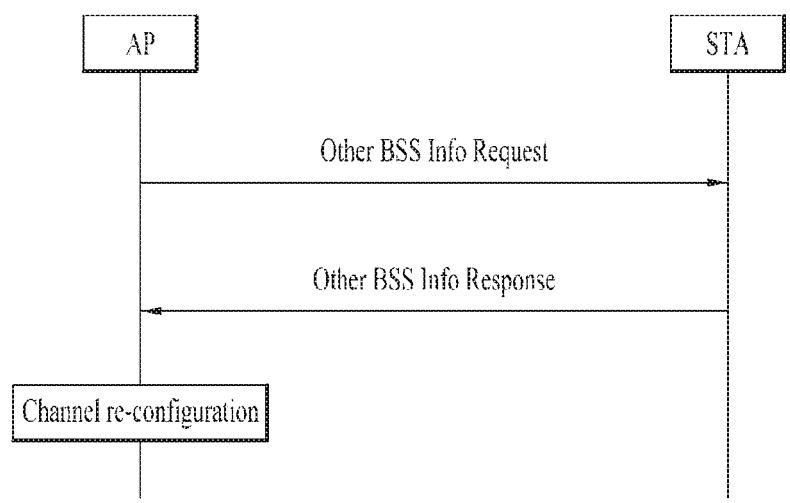
FIG. 16 is a diagram illustrating a format of a High Efficiency WLAN (HEW) Capabilities element according to an embodiment of the present invention.
FIG. 17 is a diagram illustrating a field indicating whether a downlink oriented channel is supported or not, illustrated in FIG. 16.
FIGS. 18, 19, and 20 are diagrams illustrating signal flows for methods of collecting information about one other Basic Service Set (BSS) through an STA by an AP according to embodiments of the present invention.

In other words, a HEW STA may announce that it is a HEW STA by transmitting a HEW Capabilities element. As illustrated in FIG. 16, the HEW Capabilities element may include various fields to indicate the HEW capabilities of the HEW STA.

Specifically, the HEW Capabilities element may have a field indicating whether a DL oriented channel is supported, as illustrated in FIG. 17. A DL oriented channel Support subfield may be defined as illustrated in [Table 2].

TABLE 2

| Subfield | Density | Encoding |
| --- | --- | --- |
| DL oriented channel Support | Indicates support for DL oriented channel operation | Set to 0 if not supported.<br>Set to 1 if supported. |

If the AP is capable of listening to a signal from an AP belonging to another BSS, the AP may appropriately configure a primary channel, a secondary channel, and a DL oriented channel. On the contrary, if the AP is not capable of directly listening to a signal from the AP of the different BSS, the AP may configure the channels arbitrarily. According to a preferred embodiment of the present invention, however, if some STAs associated with the AP are located in the area of another BSS, the AP may collect channel information about the BSS from the STAs and change channel information based on the collected channel information.

FIG. 18 illustrates a method for collecting information about a different BSS through an STA by an AP according to an embodiment of the present invention.

As illustrated in FIG. 18, if there is one other BSS around the STA, the AP may request the STA to transmit information about the other BSS. Upon receipt of the other BSS information request from the associated AP, the STA may transmit information about the other BSS that the STA has, or may receive information about the other BSS by scanning (receiving a Beacon frame or a Probe Response frame) during a predetermined time period and transmit the received other BSS information to the AP.

Upon receipt of the other BSS information request message from the AP, the STA may transmit information about a neighbor BSS to the AP based on previously received information (a Beacon frame, a Probe Response frame, or the like). The AP may reconfigure channels appropriately based on the information received from the STA according to the afore-described criterion.

The other BSS information that the STA transmits to the AP may be system information acquired by receiving a Beacon frame or a Probe Response frame from the other BSS. For example, the STA may transmit one or more of the BSSID, primary and secondary channel information (e.g., a primary channel index), bandwidth, DL oriented channel information, and operating class of the other BSS in an Other BSS Info element.

Figure 19:
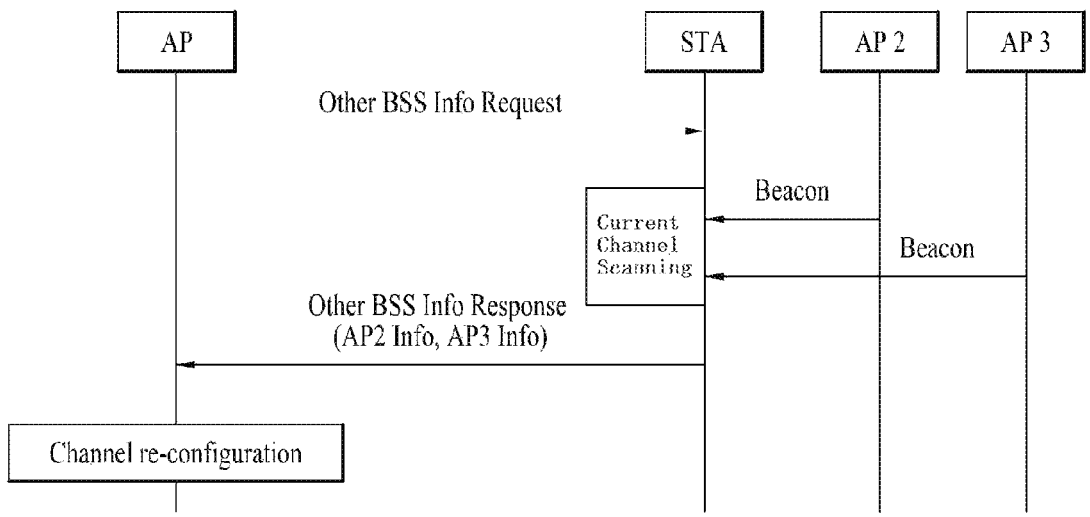

FIG. 19 illustrates a method of acquiring other BSS information by an AP according to another embodiment of the present invention.

As illustrated in FIG. 19, upon receipt of an Other BSS Info Request message from an AP associated with an STA, the STA may transmit acquired information about other BSSs to the AP after scanning current channels (receiving Beacon frames or Probe Response frames. The AP may reconfigure channels appropriately based on the information received from the STA. In this case, the AP may not transmit a DL frame to the STA until the AP receives other BSS information from the STA after transmitting the Other BSS Infor Request message to the STA.

Figure 20:
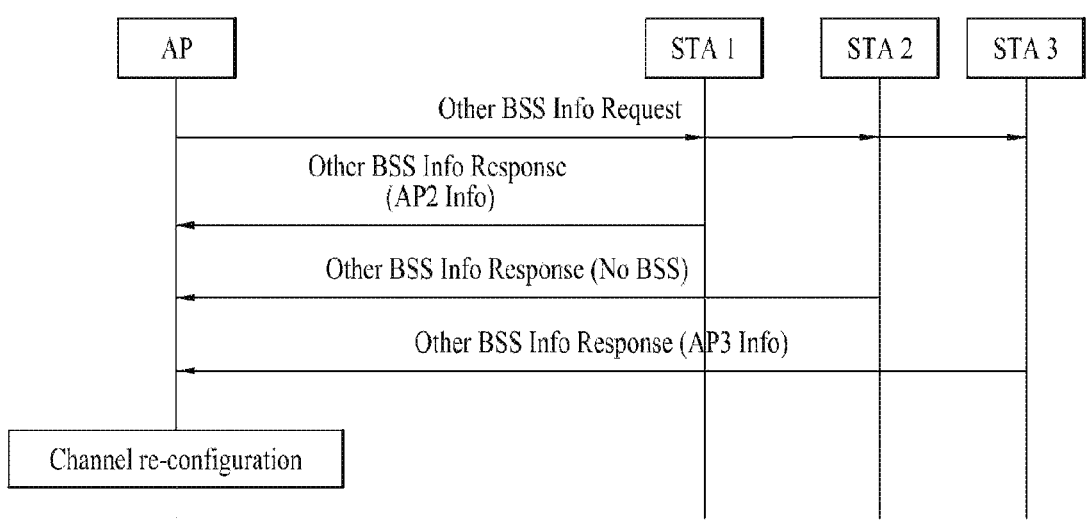

FIG. 20 illustrates a method for acquiring other BSS information by an AP according to another embodiment of the present invention.

As illustrated in FIG. 20, the AP may acquire neighbor BSS information from one or more STAs by broadcasting/multicasting an Other BSS Info Request message.

In the example of FIG. 20, the AP broadcasts an Other BSS Info Request message. Upon receipt of the Other BSS Info Request message, STAs may transmit other BSS information in response messages. In this case, the STAs may transmit the response messages in one or both of two types of information (previously acquired information and information acquired by channel scanning after request reception).

On the other hand, an STA which has failed in acquiring other BSS information may transmit a response message to the AP, indicating the absence of the information. That is, in the example of FIG. 20, because STA 2 cannot acquire information about other BSSs due to its location in an area not overlapped with the other BSSs, STA 2 may transmit a response message indicating no other BSS information to the AP in response to the Other BSS Info Request message.

Figure 21:
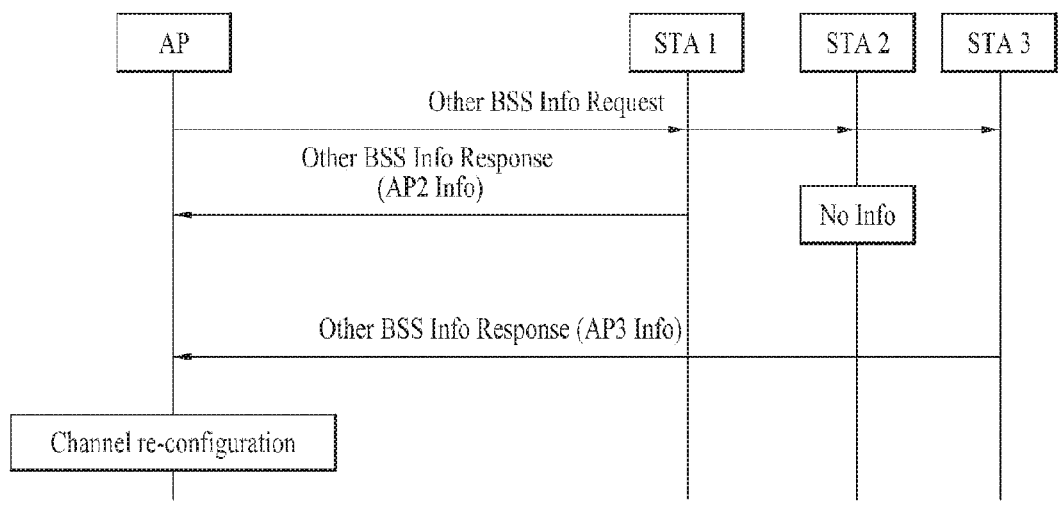
FIGS. 21 and 22 are diagrams illustrating operation examples different from the operation example of FIG. 20.
Figure 22:
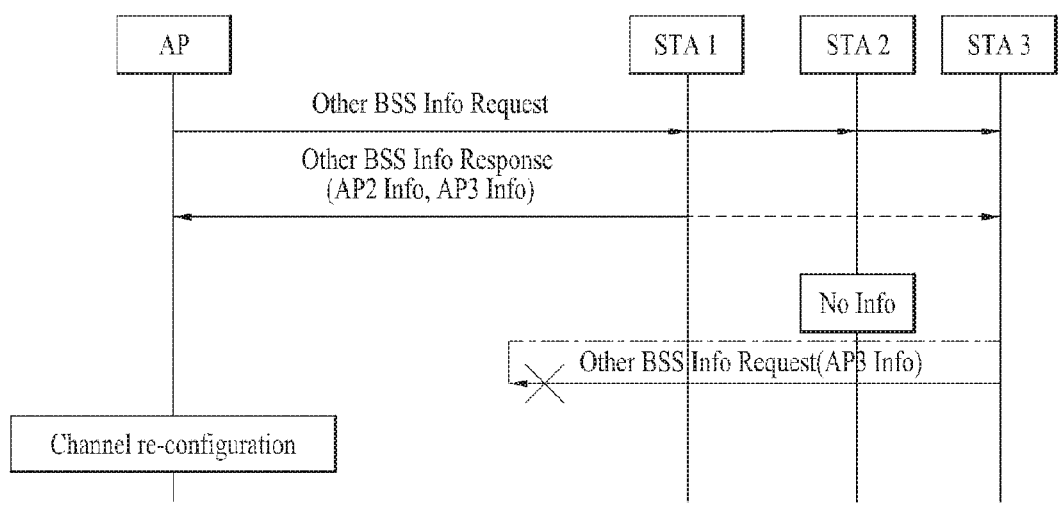

FIGS. 21 and 22 are diagrams illustrating operation examples different from the operation example of FIG. 20.

As illustrated in FIG. 21, an STA which has failed in acquiring other BSS information may not transmit a response message to the AP in response to the Other BSS Info Request message in another embodiment of the present invention. Specifically, although STA 2 has received the Other BSS Info Request message from the AP, STA 2 does not have other BSS information and thus may not transmit a response frame to the AP in FIG. 21.

As illustrated in FIG. 22, if a specific STA has the same other BSS information as other BSS information transmitted by another STA, the specific STA may not transmit a response message in order to avoid redundancy.

Specifically, when STA 3 overhears an Other BSS Info Response transmitted by STA 1 after receiving the Other BSS Info Request message from the AP, if the Other BSS Info Response includes the same information as other BSS information that STA 3 has, STA 3 may not transmit a response frame.

Now, a description will be given of a method of applying the foregoing wireless channel allocation method in conjunction with a frequency repartition scheme. That is, the problems encountered with dedicated use of one channel, frequency use inefficiency and performance degradation int a BSS edge region may be solved by performing the wireless channel allocation method in combination with the frequency repartition scheme based on an STA location and signal power.

In the case where STAs of one BSS belong to the area of another BSS, if an AP transmits DL data to the STAs unconditionally, DL data transmission failure may occur in many cases. This happens because it is difficult to ensure a mutual hearable situation for AP 1 and AP 2, especially in a small cell (BSS) deployment environment.

Hereinbelow, a method of reducing DL transmission failures will be provided.

Figure 23:
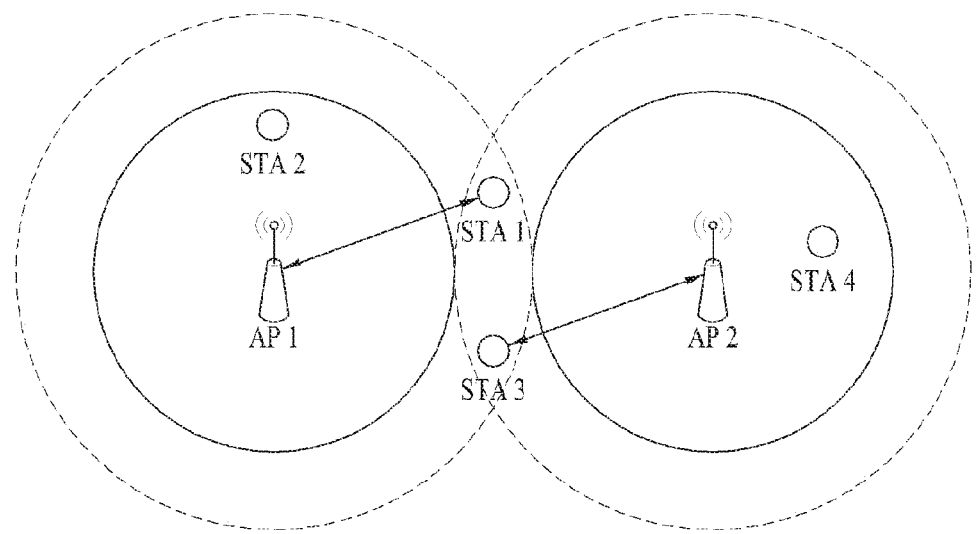
FIGS. 23 and 24 are diagrams describing a problem encountered when an STA of a specific BSS is located across the area of an adjacent BSS.
Figure 24:
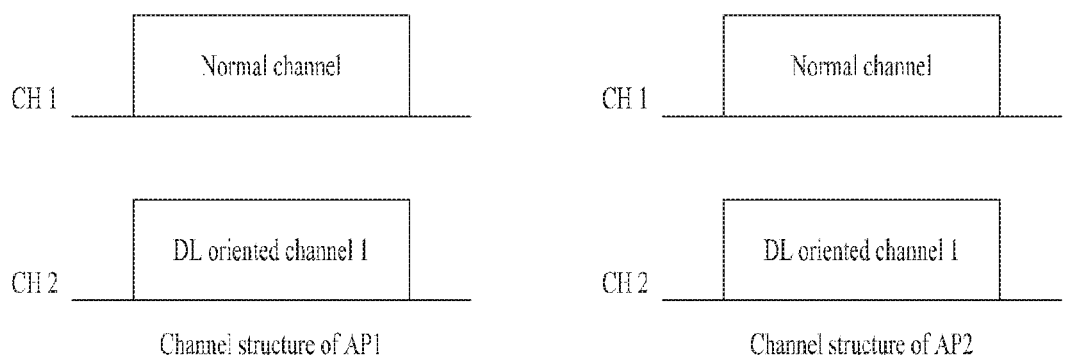

FIGS. 23 and 24 are diagrams describing a problem encountered when an STA of a specific BSS is located across the area of an adjacent BSS.

In the example of FIG. 23, STA 1 and STA 2 are associated with AP 1, whereas STA 3 and STA 4 are associated with AP 2. STA 1 and STA 3 are located in the transmission areas of AP 1 and AP 2. STA 2 is located in the transmission area of AP 1 and STA 4 is located in the transmission area of AP 2. Each of AP 1 and AP 2 does not belong to the transmission area of the other AP.

Meanwhile, as illustrated in FIG. 24, CH 2 is configured as a DL oriented channel and CH 1 is configured as a normal channel in both BSS 1 of AP 1 and BSS 2 of AP 2. CH 1 may be a primary channel, as described before.

To efficiently transmit data to STA 1 and STA 3 in the above situation, the following embodiments are proposed.

<Embodiment 1>

Figure 25:
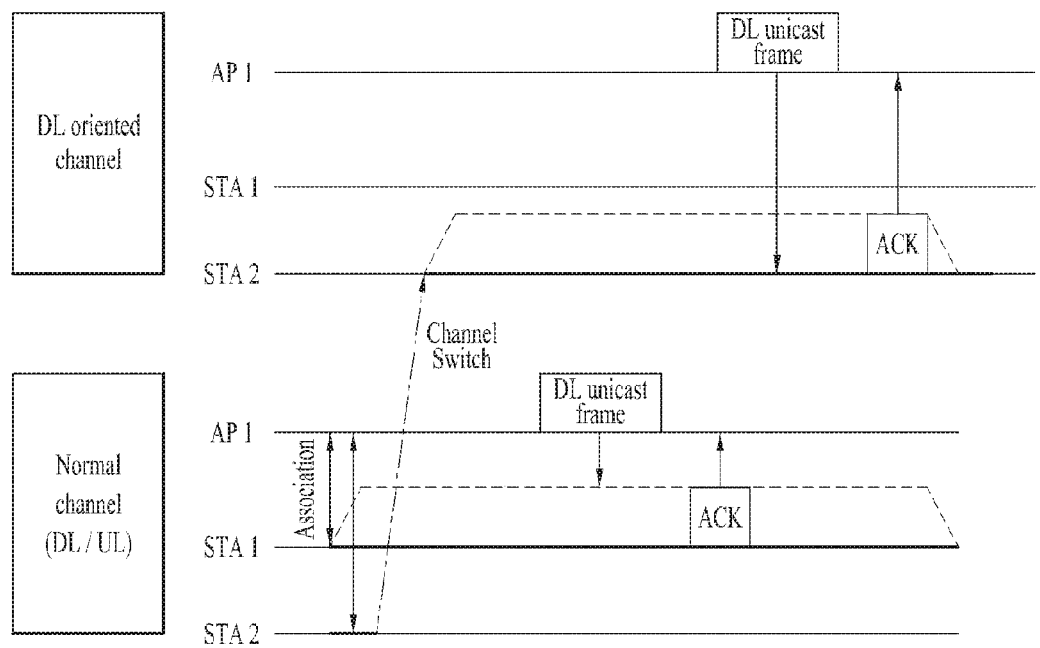
FIGS. 25 to 29 are diagrams illustrating transmission of downlink data to an STA located in a BSS edge region according to embodiments of the present invention.

FIG. 25 is a diagram illustrating an embodiment of the present invention for transmitting DL data to an STA located in a BSS edge region.

AP 1 may transmit DL data to STA 2 and STA 1 on a DL oriented channel. In the embodiment, however, it is proposed that DL data is transmitted on a normal channel to STAs (e.g., STA 1) within the transmission range of another BSS (e.g., due to lots of DL data transmission failures or acquisition of other BSS information from an STA). AP 2 may also transmit DL data on the normal channel to STAs (e.g., STA 3) within the transmission range of another BSS.

As illustrated in FIG. 25, after STA 1 and STA 2 are associated with AP 1 on the normal channel, STA 1 may receive a DL frame on the normal channel from AP 1 because STA 1 is located within the transmission range of another BSS, and STA 2 may switch to the DL oriented channel and then receive a DL frame on the DL oriented channel because STA 2 is not within the transmission range of another BSS.

An STA may determine that it is located within the transmission range of another BSS, when the STA discovers another AP and receives system information (a Beacon frame or a Probe Response frame) from the other AP. When transmission of an STA within the transmission area of another BSS is detected, the STA may also determine that it is located within the transmission range of the other BSS. The determination may be based on a criterion that the BSSID of an AP other than a target AP from which a signal strength like an RSSI is measured.

While the embodiment has been described mainly in the context of division of a BSS center region and a BSS edge region, it is apparent that the embodiment may be implemented in conjunction with another frequency repartition scheme (e.g., 3 factor based frequency repartition).

<Embodiment 2>

Figure 26:
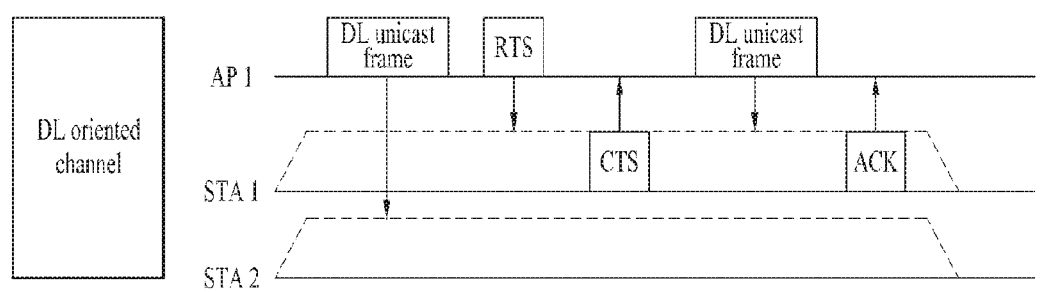

FIG. 26 illustrates another embodiment of the present invention for transmitting DL data to an STA located in a BSS edge region.

The embodiment proposes that AP 1 may transmit DL data on a DL oriented channel to associated STAs (e.g., STA 1 and STA 2) and when transmitting DL data to STAs within the transmission area of another BSS, the AP transmits the DL data using an RTS/CTS frame.

In the example illustrated in FIG. 26, because STA 2 does not belong to the area of another BSS, AP 1 may transmit a DL frame directly to STA 2. However, STA 1 also belongs to the transmission area of the other BSS. Thus, it is proposed that when AP 1 transmits DL data to STA 1, AP 1 transmits the DL data to STA 1 after exchanging an RTS frame and a CTS frame, as described before.

<Embodiment 3>

Embodiment 1 and Embodiment 2 may be implemented in combination. In other words, DL data may be transmitted to a part of STAs in the area of another BSS on a normal channel, whereas DL data may be transmitted to another part of the STAs within the area of the other BSS on a DL oriented channel, using an RTS/CTS frame.

<Embodiment 4>

Figure 27:
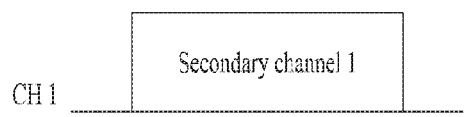
Figure 27:
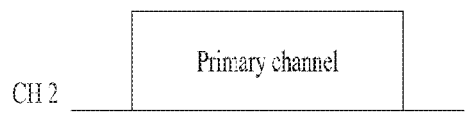
Figure 27:
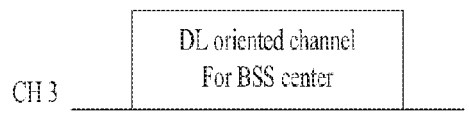
Figure 27:
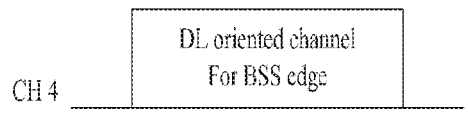
Figure 27:
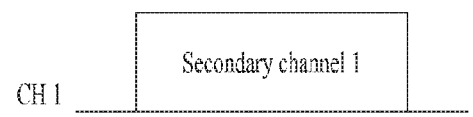
Figure 27:
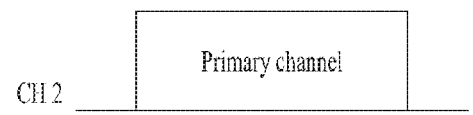
Figure 27:
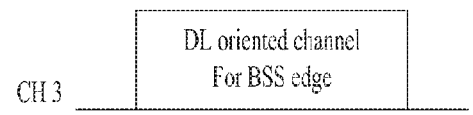
Figure 27:
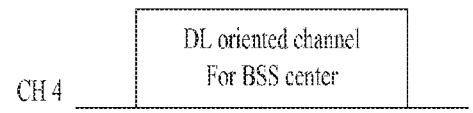

FIG. 27 illustrates another embodiment of the present invention for transmitting DL data to an STA located in a BSS edge region.

If an AP uses multiple channels as DL oriented channels, the AP may use one channel for STAs located at a BSS center (i.e., not belonging to another BSS) and another channel for STAs in a BSS edge region (i.e., belonging to another BSS), as illustrated in FIG. 27.

In the example of FIG. 27, AP 1 and AP 2 may use CH 3 and CH 4 as DL oriented channels, and AP 1 may operate CH 3 for STAs at the center of a BSS (or cell) and CH 4 for STAs at the edge of the BSS. Meanwhile, AP 2 may operate CH 3 for STAs at the edge of a BSS (or cell) and CH 4 for STAs at the center of the BSS.

<Embodiment 5>

The embodiment of the present invention is based on the assumption that when a DL frame is transmitted to STAs in a BSS edge region or within the transmission coverage of another BSS, the DL frame is transmitted on a normal channel, and proposes that when DL data is transmitted on a normal channel, a DL frame is transmitted to STAs in a BSS edge region or within the transmission coverage of another BSS using an RTS/CTS procedure.

<Embodiment 6>

Figure 28:
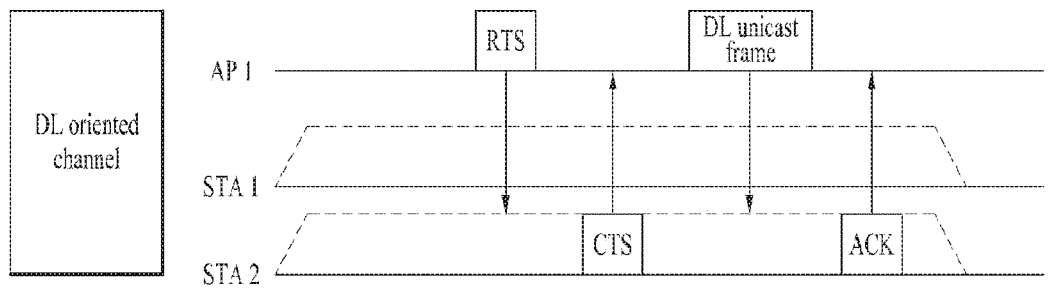

FIG. 28 illustrates another embodiment of the present invention for transmitting DL data to an STA located in a BSS edge region.

The embodiment of the present invention proposes that when an AP transmits a DL frame to an STA irrespective of whether the STA is in a BSS edge region, the AP transmits the DL frame on a DL oriented channel after exchanging an RTS/CTS frame with the STA.

<Embodiment 7>

If an AP transmits a DL frame to every STA using an RTS/CTS as in Embodiment 6, unnecessary overhead may be increased. To reduce the unnecessary overhead, the AP may start to use an RTS/CTS only when an OBSS is severe in a high-density WLAN. Or when transmitting a DL frame on a DL oriented channel without an RTS/CTS, the AP may transmit a DL frame to a corresponding STA using an RTS/CTS at the next transmission, only when transmission failure often occurs.

<Embodiment 8>

Figure 29:
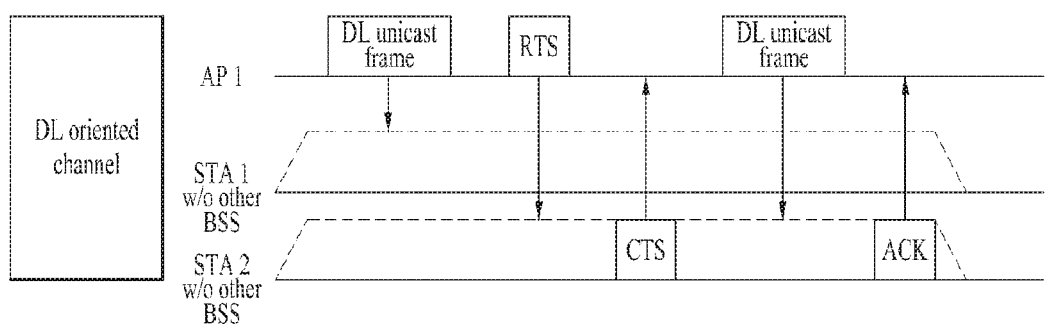

FIG. 29 illustrates another embodiment of the present invention for transmitting DL data to an STA located in a BSS edge region.

In the embodiment, when an AP transmits a DL frame to STAs on a DL oriented channel, if an STA is located within the transmission coverage of another BSS, the AP transmits a DL frame to the STA after exchanging an RTS/CTS frame. The AP transmits a DL frame directly to an STA not within the transmission coverage of another BSS, without an RTS/CTS exchange.

In the example of FIG. 29, since STA 1 is not within the transmission coverage of one or more other BSSs, AP 1 may transmit a DL frame directly to STA 1 without an RTS/CTS exchange. On the contrary, since STA 2 is within the transmission coverage of another BSS, AP 1 may transmit a DL frame to STA 2 after an RTS/CTS exchange.

Figure 30:
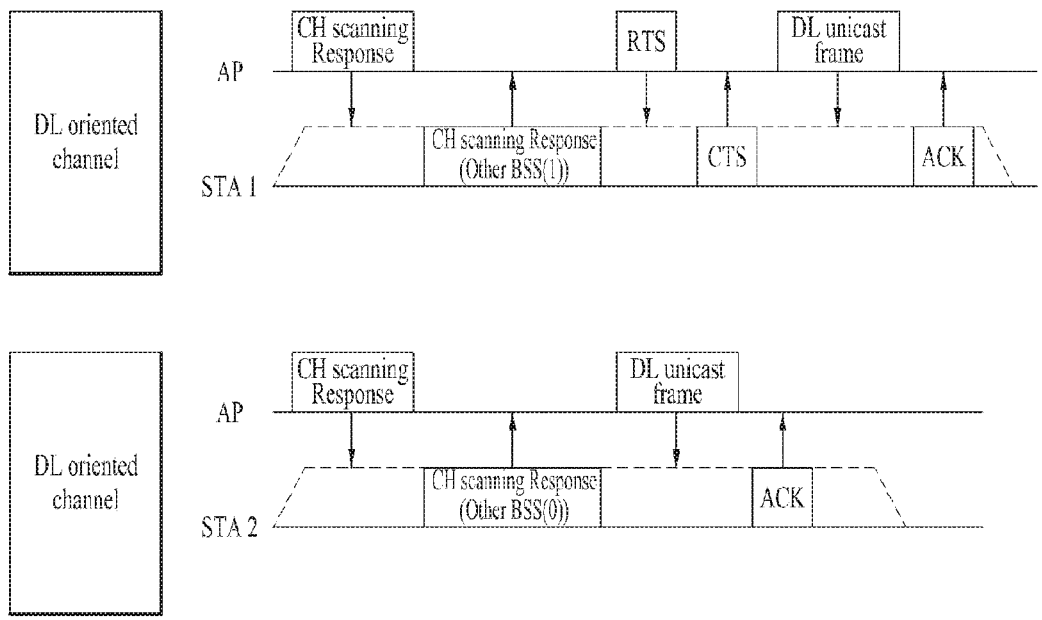
FIGS. 30 and 31 are diagrams illustrating methods of determining whether an STA associated with an AP is located within the coverage of another BSS by an AP according to embodiments of the present invention.

FIG. 30 illustrates an embodiment for determining whether an associated STA is located within the coverage of another BSS by an AP.

To determine whether STAs are located within the coverage of another BSS, the AP may transmit a Channel Scanning Request message to the STAs. Upon receipt of the Channel Scanning Request message, an STA may scan a DL oriented channel and report a scanning result to the AP. The STA, which has received the Channel Scanning Request message, may include, in a Channel Scanning Report/Response message, information (e.g., information indicating the presence of other BSSs, the number of other BSSs, and the BSSIDs of other BSSs) extracted based on frames received from STAs/APs of other BSSs during a scanning interval and transmit the Channel Scanning Report/Response message to the AP. Upon receipt of the Channel Scanning Report/Response message, the AP may determine whether the STA is located within the coverage of another BSS. If the STA is located within the coverage of another BSS, the AP may exchange an RTS/CTS frame with the STA before transmitting a DL frame to the STA. If the STA is not located within the coverage of another BSS, the BS may transmit a DL frame directly to the STA without exchanging an RTS/CTS frame.

Herein, it may be said that the Channel Scanning Request frame and the Channel Scanning Report/Response frame are similar to the afore-described Other BSS Info Request frame and Other BSS Info Response frame.

In the example of FIG. 30, STA 1 is located within the transmission coverage of one other BSS and indicates its presence within the other BSS to the AP by a Channel Scanning Response frame. Therefore, the AP may exchange an RTS/CTS frame with STA 1 before transmitting a DL frame to STA 1. Since STA 2 is not located within the transmission coverage of another BSS, the AP may transmit a DL frame directly to STA 1 without an RTS/CTS exchange.

Upon receipt of a frame that does not include the BSSID of a BSS to which an STA belongs, the STA may determine that it is located within the transmission coverage of another BSS.

Figure 31:
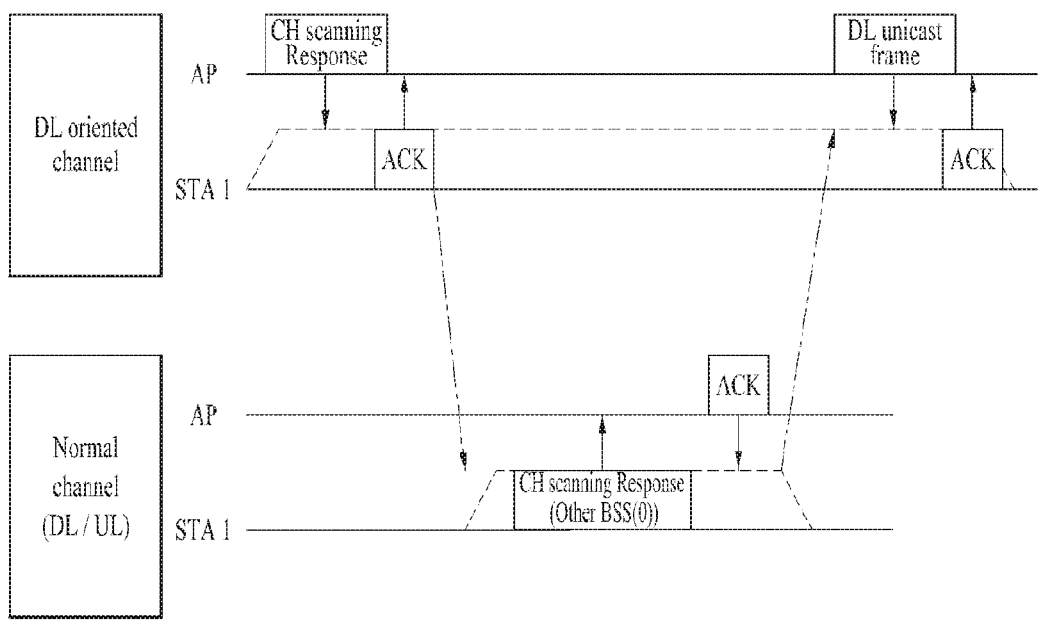

FIG. 31 illustrates another embodiment for determining whether an associated STA is located within the coverage of another BSS by an AP.

Unlike the example of FIG. 30, a Channel Scanning Response frame may be transmitted not on a DL oriented channel but on a normal channel. As illustrated in the example of FIG. 31, if STA 1 receives a Channel Scanning Request message on a DL oriented channel, STA 1 may switch to a normal channel, transmit a Channel Scanning Response frame to the AP by EDCA, and return to the DL oriented channel. In the above example, the AP may transmit a DL frame directly to STA 1 without an RTS/CTS exchange because STA 1 is not located within the transmission coverage of another BSS.

In another embodiment of the present invention, the AP may transmit a DL frame to an STA that has experienced DL frame transmission failure, after exchanging an RTS/CTS frame with the STA, and determine whether there is another BSS on a corresponding channel by invoking a channel scanning procedure for the STA.

Figure 32:
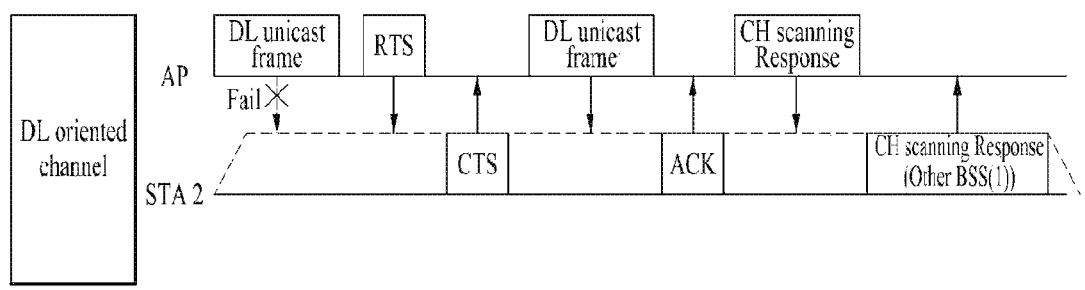
FIG. 32 is a diagram illustrating a method of initiating a channel scanning procedure upon transmission failure according to an embodiment of the present invention.

FIG. 32 illustrates a method of starting a channel scanning procedure upon transmission failure according to an embodiment of the present invention.

An STA having DL oriented channel capabilities may be aware of a BSS using each channel during scanning and store information about the BSS. Then, the STA may transmit information (e.g., information indicating whether the STA is located within the transmission coverage of another BSS) about a corresponding channel (particularly, a DL oriented channel) to the AP during association. If the STA receives a frame from another BSS after the association, the STA may transmit related information to the AP.

Figure 33:
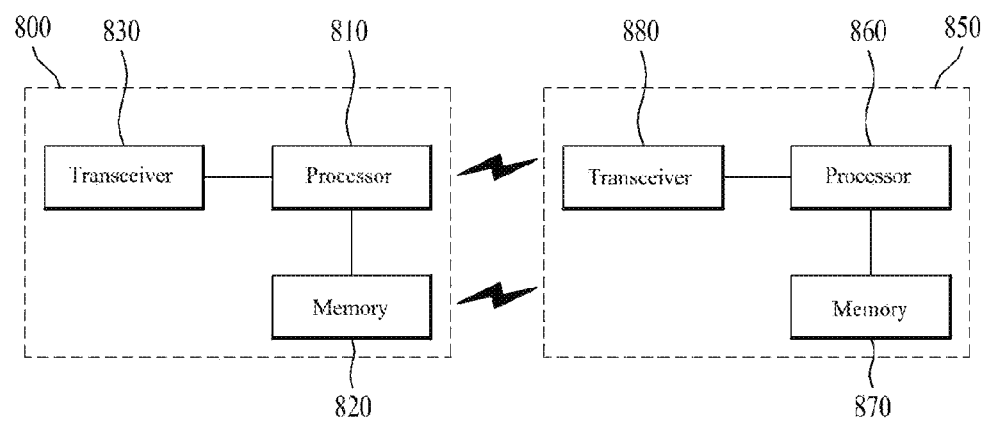
FIG. 33 is a block diagram illustrating apparatuses for implementing WLAN operation methods that use a downlink oriented channel.

FIG. 33 is a diagram for explaining an apparatus for implementing the above-described method.

A wireless apparatus 800 of FIG. 33 may correspond to the above-described STA and a wireless apparatus 850 of FIG. 33 may correspond to the above-described AP.

The STA 800 may include a processor 810, a memory 820, and a transceiver 830 and the AP 850 may include a processor 860, a memory 870, and a transceiver 860. The transceivers 830 and 880 may transmit/receive a wireless signal and may be implemented in a physical layer of IEEE 802.11/3GPP. The processors 810 and 860 are implemented in a physical layer and/or a MAC layer and are connected to the transceivers 830 and 880. The processors 810 and 860 may perform the above-described UL MU scheduling procedure.

The processors 810 and 860 and/or the transceivers 830 and 880 may include an Application-Specific Integrated Circuit (ASIC), a chipset, a logical circuit, and/or a data processor. The memories 820 and 870 may include a Read-Only Memory (ROM), a Random Access Memory (RAM), a flash memory, a memory card, a storage medium, and/or a storage unit. If an embodiment is performed by software, the above-described method may be executed in the form of a module (e.g., a process or a function) performing the above-described function. The module may be stored in the memories 820 and 870 and executed by the processors 810 and 860. The memories 820 and 870 may be located at the interior or exterior of the processors 810 and 860 and may be connected to the processors 810 and 860 via known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the present invention has been described above in the context of an IEEE 802.11 WLAN system, the present invention is not limited to the specific system. Therefore, the present invention is applicable in the same manner to various wireless systems requiring control of interference between wireless devices.

The invention claimed is:

1. A method of establishing a wireless channel by an Access Point (AP) in a Wireless Local Area Network (WLAN) system, the method comprising;
establishing a primary channel and one or more secondary channels; and
configuring the one or more secondary channels as one or more downlink oriented channels,
wherein the one or more downlink oriented channels are configured not to overlap with a primary channel of an adjacent Basic Service Set (BSS), and a frame including configuration information about the one or more downlink oriented channels is transmitted to a Station (STA) associated with the AP,
wherein, if a first STA among STAs associated with the AP is located at a position not overlapped with an area of another BSS, the AP transmits data to the first STA on the one or more downlink oriented channels, and
wherein, if a second STA among the STAs associated with the AP is located at a position overlapped with the area of another BSS, the AP transmits data to the second STA on a normal channel other than the one or more downlink oriented channels.

2. The method according to claim 1, further comprising:
transmitting a request message requesting information about the adjacent BSS to the STA associated with the AP; and
receiving a response message including information about the adjacent BSS from the STA associated with the AP.

3. The method according to claim 2, wherein the request message requesting information about the adjacent BSS is broadcast or multicast to a plurality of STAs associated with the AP, and information about the adjacent BSS that one or more of the plurality of STAs have is received in response messages.

4. The method according to claim 2 or 3, wherein the response message including the information about the adjacent BSS includes at least one of a BSS Identifier (BSSID), primary and secondary channel information, bandwidth information, downlink oriented channel information, and operating class of the adjacent BSS.

5. The method according to claim 1, wherein the AP transmits data to the first STA on the one or more downlink oriented channels, without exchanging a Request To Send (RTS) frame and a Clear To Send (CTS) frame.

6. The method according to claim 5, wherein the AP transmits data to the second STA on the normal channel other than the one or more downlink oriented channels, after exchanging the RTS frame and the CTS frame.

7. The method according to claim 1, wherein if a data transmission state of a third STA among STAs associated with the AP is equal to or lower than a predetermined level, the AP transmits data to third first STA on a normal channel other that the one or more downlink oriented channels, or on the one or more downlink oriented channels after exchanging an RTS the RTS frame and the CTS frame.

8. The method according to claim 1, wherein if the number of the one or more downlink oriented channels is 2 or larger, a first-type downlink oriented channel is configured for the first STA, and a second-type downlink oriented channel is configured for the second STA.

9. The method according to claim 8, wherein the second-type downlink oriented channel is configured to be a different frequency channel from a second-type downlink oriented channel of the adjacent BSS.

10. The method according to claim 1, wherein the AP determines whether each STA associated with the AP is located at a position overlapped with the area of another BSS by receiving a scanning result from the STA.

11. An Access Point (AP) for establishing a wireless channel in a Wireless Local Area Network (WLAN) system, the AP comprising;
    a transceiver configured to transmit and receive signals to and from a Station (STA) associated with the AP; and
    a controller connected to the transceiver and configured to establish a primary channel and one or more secondary channels, and configure the one or more secondary channels as one or more downlink oriented channels,
    wherein the controller configures the one or more downlink oriented channels not to overlap with a primary channel of an adjacent Basic Service Set (BSS), and transmit a frame including configuration information about the one or more downlink oriented channels to an STA associated with the AP through the transceiver,
    wherein, if a first STA among STAs associated with the AP is located at a position not overlapped with an area of another BSS, the controller controls the transceiver to transmit data to the first STA on the one or more downlink oriented channels, and
    wherein, if a second STA among the STAs associated with the AP is located at a position overlapped with an area of another BSS, the controller controls the transceiver to transmit data to the second STA on a normal channel other than the one or more downlink oriented channels.

* * * * *